(12) United States Patent
Marcil

(10) Patent No.: US 6,378,482 B2
(45) Date of Patent: Apr. 30, 2002

(54) PISTON

(75) Inventor: Jean-Pierre Marcil, Québec (CA)

(73) Assignee: Volvo Car Corporation, Gothenborg (SE)

( * ) Notice: Subject to any disclaimer, the term of this patent is extended or adjusted under 35 U.S.C. 154(b) by 0 days.

(21) Appl. No.: 09/681,937

(22) Filed: Jun. 28, 2001

Related U.S. Application Data

(63) Continuation of application No. PCT/SE99/02217, filed on Nov. 29, 1999.

(51) Int. Cl.[7] .................................................. F02F 3/22
(52) U.S. Cl. .................................................. 123/193.6
(58) Field of Search ............... 123/193.6; 92/181, 92/160, 182, 183, 184, 185, 186, 181 P

(56) References Cited

U.S. PATENT DOCUMENTS

| | | | |
|---|---|---|---|
| 2,857,218 A | * 10/1958 | Pachernegg | ............. 92/160 |
| 3,336,844 A | * 8/1967 | Cornet | ............. 92/186 |
| 3,667,443 A | 6/1972 | Currie et al. | |
| 4,383,509 A | 5/1983 | Bauer | |
| 4,440,069 A | * 4/1984 | Holtzberg et al. | ........ 123/193.6 |
| 4,798,770 A | * 1/1989 | Donomoto et al. | ........ 123/193.6 |
| 4,848,212 A | * 7/1989 | Kawano et al. | ........ 123/193.6 |
| 6,119,647 A | * 9/2000 | Sytsma | ........ 123/193.6 |

FOREIGN PATENT DOCUMENTS

| | | |
|---|---|---|
| JP | 7293431 A | 11/1995 |

* cited by examiner

*Primary Examiner*—Marguerite McMahon
(74) *Attorney, Agent, or Firm*—Kilpatrick Stockton LLP

(57) ABSTRACT

A piston for reciprocal movement in a cylinder in an internal combustion engine is disclosed. The piston has a lateral surface that is provided with at least two spaced peripheral piston ring grooves for individual piston rings. A collection chamber is arranged between the piston ring grooves. This collection chamber is made of a peripheral groove arranged in the lateral surface and at least one space, which communicates with the collection chamber, is arranged in the piston. The collection chamber and the space are made to take up uncombusted air-fuel mixture and combustion gases that have passed one of the piston rings.

9 Claims, 2 Drawing Sheets

PISTON

CROSS REFERENCE TO RELATED APPLICATIONS

This is a continuation patent application of International Application Number PCT/SE99/02217 filed Nov. 29, 1999 that designates the United States. The full disclosure of said application, in its entirety, is hereby expressly incorporated by reference into the present application.

BACKGROUND OF INVENTION

1. Technical Field

The present invention relates to a piston designed for reciprocating movement in a cylinder in an internal combustion engine. More specifically, the present invention relates to a piston having a lateral surface that is provided with at least two spaced peripheral piston ring grooves for individual piston rings.

2. Background Information

It is known that it is not possible in an internal combustion engine to provide piston ring sealing between pistons and their surrounding cylinder walls that completely seals off the combustion chambers from the crankcase of the engine. A certain small quantity of combustion gases, referred to as blow-by, always flows past the piston ring and down into the crankcase of the engine. In order to prevent excessive overpressure, partially caused by the blow-by gases, from occurring in the crankcase, the crankcase must be ventilated. The more effective the ventilation is the lower the overpressure in the crankcase will be and, therefore, the lower the engine pumping losses will be.

In modern engines, closed crankcase ventilation minimizes environmental effects. Normally, the blow-by gases are led out from the crankcase via a hose to the inlet manifold of the engine before the throttle and mix with the intake air. In order to separate oil unavoidably mixed with blow-by out of the oil mist, different types of filters and oil traps are used in the crankcase ventilation. All previously known crankcase ventilation systems have not made it possible to minimize a certain overpressure in the crankcase that increases as power demand increases. This means that a much higher pressure exists in the crankcase of the engine than in the combustion chamber during the intake stroke. This crankcase pressure tends to press the oil mist in the crankcase past the oil scraper ring of the piston and into the combustion chamber of the engine. In order to minimize oil flow to the combustion chamber, the ring tension must be high for the oil scraper ring. The oil scraper ring is the one component that causes the greatest internal friction in the engine. The oil that nevertheless penetrates into the combustion chamber of the engine not only causes pollution in the engine exhaust gases, but also places strain on the catalytic converter. Further, it lowers the octane rating of the fuel, which in modern engines with knock sensors and automatic ignition advance leads to a retarding of the ignition and thus increased fuel consumption. Last but not least, the oil consumption of the engine itself and the cost of replacing used oil are directly dependent on how much oil penetrates into the combustion chamber because of the pressure difference between the crankcase and the cylinder space above the piston.

SUMMARY OF INVENTION

The present invention provides a piston that can both take up at least a portion of the volume of combusted and/or uncombusted air-fuel mixture which, during the combustion stroke, is pressed past the piston rings, and obtain a reduction in the pressure of the volume of combusted and/or uncombusted air-fuel mixture taken up in the piston. This is accomplished by arranging a collection chamber between the piston ring grooves. The collection chamber has a peripheral groove in the lateral surface and at least one space arranged in the piston that communicates with the collection chamber. The collection chamber and space collect uncombusted air-fuel mixture and combustion gases that have passed at least one of the piston rings.

The design according to the invention makes it possible to maintain substantially near equilibrium pressure between the combustion chamber and the crankcase. This means that an underpressure is present in the crankcase during the inlet stroke. The pressure difference over the piston rings becomes so negligible that ring tension in the oil scraping ring is reduced to a fraction of what is normal without the risk of oil penetration from the crankcase to the combustion chamber.

In addition to the direct effects that the pressure balancing gives in the shape of lower oil and fuel consumption, important secondary effects are attained. Lower ring tension, producing a lower internal friction with consequential lower fuel consumption, leads to lower starting power for the starting motor, i.e., smaller starting motor and starting battery. A smaller quantity of pollution in the exhaust gases caused by oil in the combustion chamber means a lower load on the catalytic converter, which can be made smaller. Finally, the need for external components such as heating arrangements for preventing blow-by from freezing, oil traps, and hoses with associated connection parts can be eliminated, leading to cost savings.

Unavoidably, a small quantity of blow-by, unburnt fuel and other pollutants that reach the crankcase cannot be ventilated out. This quantity remains as a suspension in the oil in the crankcase, contributing to an accelerated ageing process of the oil and impairing its lubricating qualities. This, in turn, influences the life span of the engine.

Preferably, the cylinder in which the piston is designed for reciprocating motion is provided with an evacuation channel oriented relative to the collection chamber so that, after a predetermined movement of the piston from its upper or lower dead point, a communication is established between the collection chamber and the evacuation channel. This channel, in turn advantageously communicates with an intake channel of the internal combustion engine.

In this manner, uncombusted air-fuel mixture and combustion gases are prevented from reaching the crankcase. Instead, they are ventilated directly into the evacuation channel and flow to the intake channel, since there is overpressure in the collection chamber while there is underpressure in the evacuation channel. Without this structure, uncombusted air-fuel mixture trapped beneath the first piston ring would flow back into the combustion chamber during the expansion stroke as soon as the cylinder pressure drops below the pressure of the mixture. However, this would occur too late for combustion of the mixture. By arranging a space in the piston that communicates with the collection chamber, a relatively large volume is created in the piston. This volume is so great that the pressure of the air-fuel mixture and the combustion gases drops in the collection chamber and in the space.

BRIEF DESCRIPTION OF DRAWINGS

The invention will be described in more detail with reference to the accompanying drawings, which show one example, where.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
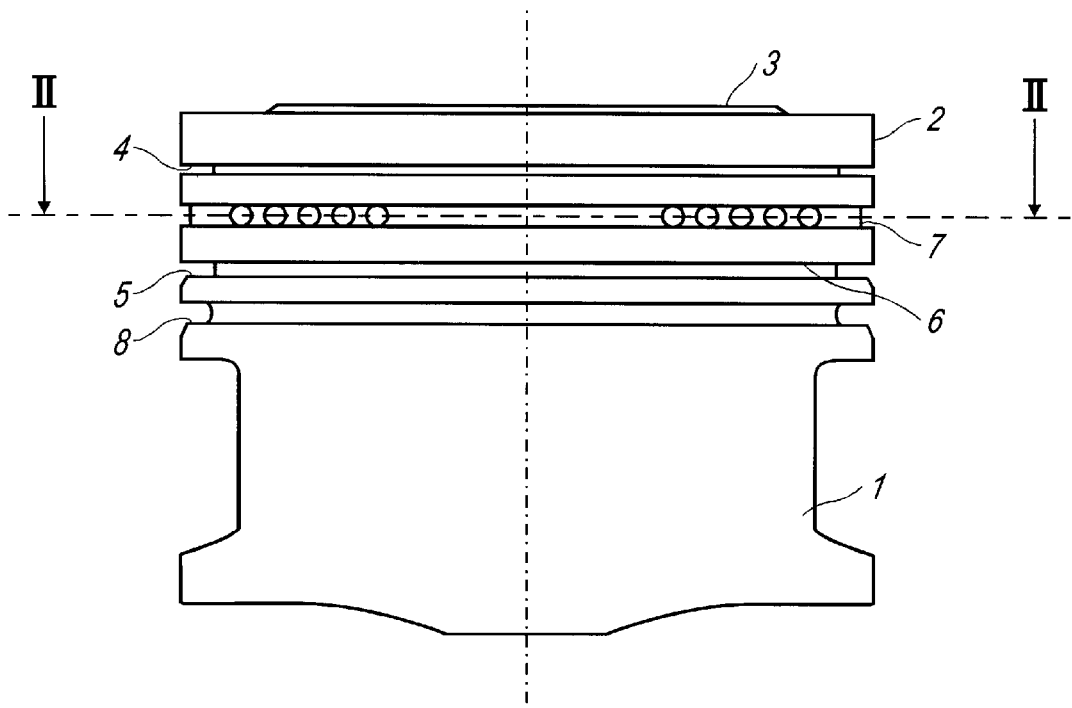
FIG. 1 illustrates a side plane view of a piston according to the invention.

FIG. 1 shows one example of a piston having a lateral surface 2 and a piston top surface 3. The lateral surface 2 has at least two spaced peripheral piston ring grooves 4, 5, each for holding a piston ring (shown in FIG. 3). A plurality of spaces in the form of elongated channels 6 is arranged in the piston 1. These channels 6 open into a collection chamber 7 formed between the piston ring grooves 4, 5. The piston thus has a first 4 and a second piston ring groove 5 between which the collection chamber 7 is found. The first and second piston ring grooves 4, 5 are able to hold a pair of piston rings (not shown in FIG. 1) in the form of compression rings. A third piston ring groove 8 is also arranged on the lateral surface 2 of the piston 1 for holding an oil scraper ring (not shown). The distance between the two piston ring grooves 4, 5 is preferably somewhat greater than what is usual in pistons 1 for a conventional multi-cylinder gasoline engine.

Figure 2:
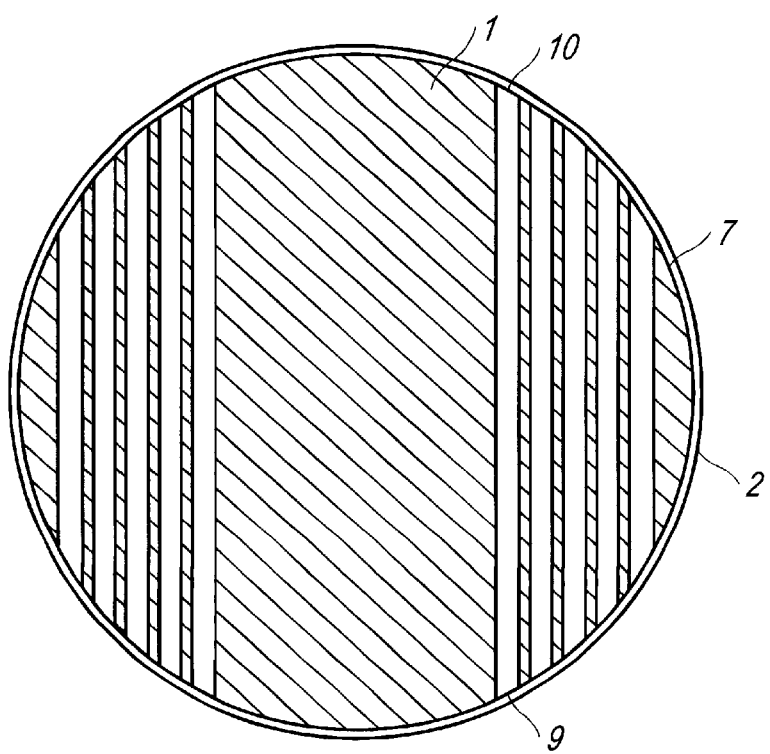
FIG. 2 illustrates a cross section of the piston along the line II—II in FIG. 1.

FIG. 2 illustrates a cross section through the piston 1 along the line II—II in FIG. 1. The channels 6 are made as through-bores in the piston 1, each opening with a first and a second opening 9, 10 into the collection chamber. The channels 6 are essentially parallel to each other. However, the channels 6 may be arranged in different directions in relation to each other. They may also be interconnected so that they communicate with each other. It is also possible to make the channels 6 into a single cavity.

As can be seen in FIGS. 1 and 2, the collection chamber 7 consists of a peripheral groove arranged on the lateral surface 2. The groove takes up uncombusted air-fuel mixture and combustion gases that have passed the piston ring in the first piston ring groove 4. The peripheral groove, which forms the collection chamber 7, may be broader than the piston ring grooves 4, 5, 8. The width of the groove is the dimension of the groove in the axial direction of the piston 1.

The cooperation of the piston 1 with a cylinder 12 in an internal combustion engine 11 will be explained with reference to FIG. 3. Blow-by gases, which during the early expansion stroke of the piston 1 flow past a first piston ring 13 adjacent the piston top surface 3, are retained in the collection chamber 7 and channels 6 by a second piston ring 14 in the second piston ring groove 5 on the other side of the collection chamber 7. Once the piston 1 has completed most of its expansion stroke, the collection chamber 7 is connected to an evacuation channel 15 opening into the cylinder 12. The evacuation channel 15 is connected to an intake channel (not shown) of the engine 11. Blow-by, which is under pressure, can now expand and be evacuated to the intake channel via the evacuation channel 15. No additional air or gas is used to press the blow-by gas out. Rather, its own pressure evacuates the gas. When the piston 1 begins to move upwardly during the exhaust stroke after having passed the lower dead center point, any remaining amount of gas can be evacuated. This is because the collection chamber 7 is still in communication with the evacuation channel 15 during the initial upward movement of the piston 1. If blow-by gas still remains in the chamber 7 and channels 6 during the final portion of the exhaust stroke and during the majority of the intake stroke, this gas can be evacuated to the intake channel when the chamber 7 and the evacuation channel 15 are again connected to each other.

In all of the operating strokes, the collection chamber 7 is thus joined with the evacuation channel 15 during certain periods. This assures that the collection chamber 7 and channels 6 are emptied at the beginning of each expansion stroke. In order to assure good communication between the collection chamber 7 and the evacuation channel 15, the width of the peripheral groove forming the collection chamber 7 is preferably approximately equal to the height of the opening 16 of the evacuation channel 15 into the cylinder 12. Here the height of the opening 16 is the extent of the opening 16 in the axial direction of the cylinder 12. The height of the lateral surface 2a of the piston 1 between the collection chamber 7 and the piston ring groove 4 and the surface 2b between the chamber 7 and the piston groove 5 are preferably at least substantially equal to the height of the opening 16 of the evacuation channel 15. In this way blow-by gases are prevented from flowing past the lateral surfaces 2a, 2b between the collection chamber 7 and the piston ring grooves 4, 5.

One or more channels 6 in the piston 1 provide, together with the collection chamber 7, a relatively large space in the piston 1 for collecting a relatively large volume of blow-by gas during the operating cycle of the engine 11. By virtue of the size of the space formed in the piston 1, the pressure of the gases in this space is reduced and leakage of gas past the second piston ring 14 minimized.

Part of the hydrocarbon emission that must be neutralized in the catalytic converter of a conventional engine is found in the unburnt air-fuel mixture that is pressed past the first compression ring during the compression stroke and trapped between the compression rings. This mixture normally flows back to the combustion chamber (referred to as reverse blow-by) when the pressure in the combustion chamber during the expansion stroke is less than the pressure in the mixture between the rings. However, this air-fuel mixture can accumulate and come back to the combustion chamber too late for burning and contributing to the output of the engine. With the evacuation channel 15, the unburnt air-fuel mixture can be evacuated from the chamber 7 and channels 6 before pressure in the combustion chamber is so low that the mixture can flow past the first piston ring 13 and back into the combustion chamber. By eliminating reverse blow-by, the quantity of hydrocarbon emission in the exhaust is reduced. This results in the size, weight and price of the catalytic converter being reduced, while also increasing its length of life.

Figure 3:
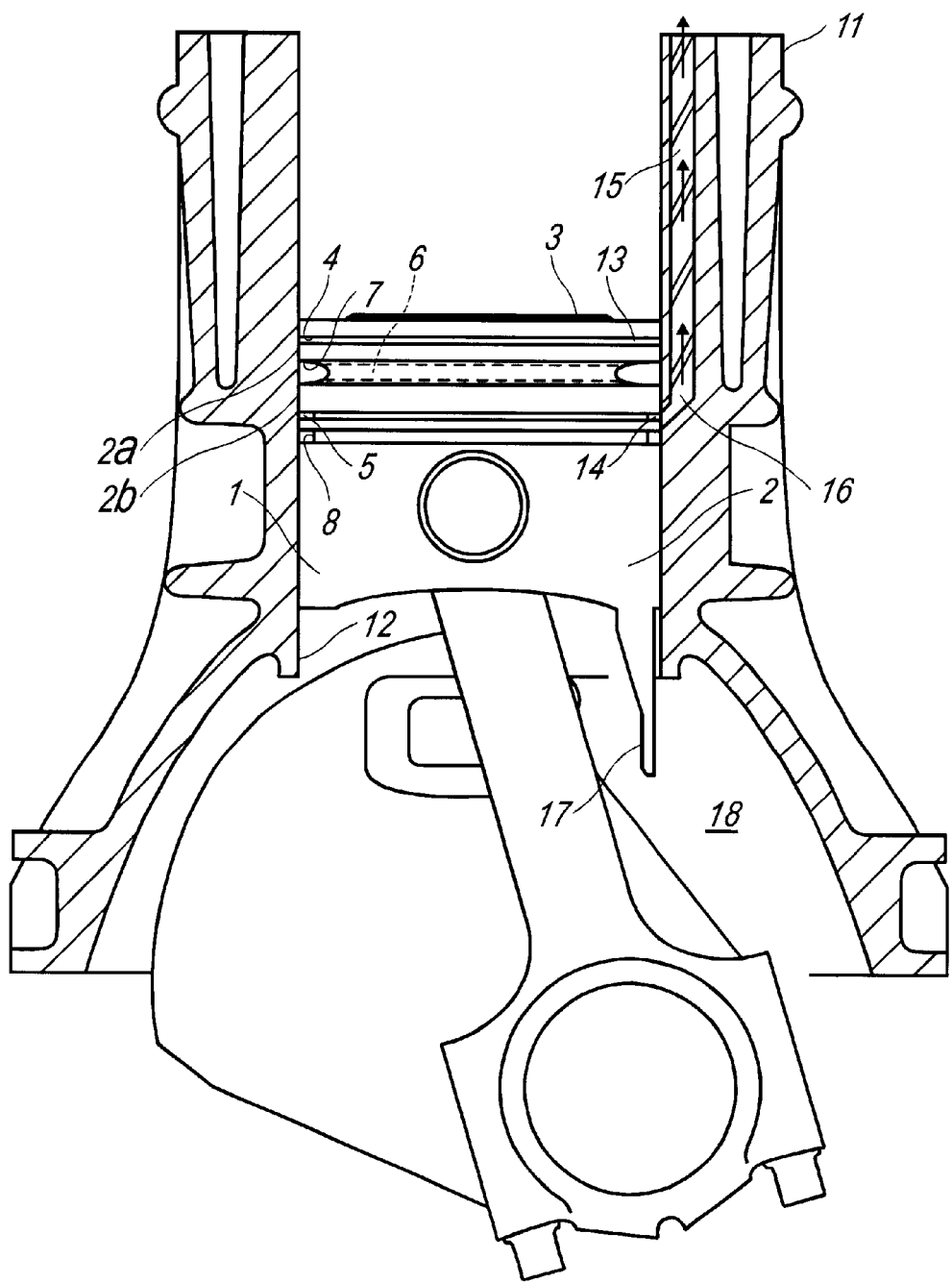
FIG. 3 illustrates a cross section through a cylinder block in which a piston according to the invention is disposed.

As can be seen from FIG. 3, the piston may be provided with a shield 17, which functions as a moving valve element, that connects the crankcase 18 to the intake channel from the upper dead center point of the piston 1 to approximately halfway through a piston stroke. In this manner, the pressure differential between the crankcase 18 and the intake channel is reduced. Closing the evacuation channel 15 causes a reduction in the inner cyclical pressure pulse effect in the crankcase 18, which could otherwise result in increased oil consumption by transferring suspended oil to the combustion chamber. The relatively low pressure in the crankcase 18 at low or medium throttle opening contributes to reducing the negative effects of these inner pressure pulses, thereby making it possible to dimension the engine 11 with a smaller crankcase volume than what has previously been possible.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A piston designed for reciprocating movement in a cylinder in an internal combustion engine, said piston comprising:

a lateral surface provided with at least two peripherally spaced piston ring grooves for individual piston rings, a collection chamber arranged between said piston ring grooves, said collection chamber further comprising a peripheral groove in said lateral surface, and at least one space arranged in the piston for communicating with said collection chamber, wherein said collection chamber and said at least one space collect uncombusted air-fuel mixture and combustion gases that have passed one of said piston rings.

2. The piston according to claim 1 wherein said space further comprises at least one elongated channel having a first opening opening into said collection chamber.

3. The piston according to claim 2 wherein said channel extends through the piston and further comprises a second opening opening into said collection chamber.

4. The piston according to claim 1 wherein said space further comprises a plurality of channels extending through the piston.

5. The piston according to claim 4 wherein said plurality of channels are essentially parallel.

6. The piston according to claim 4 wherein said plurality of channels are interconnected.

7. The piston according to claim 2 wherein said at least one channel is further comprised of at least one bore through the piston.

8. The piston according to claim 1 wherein said peripheral groove is further comprised of a width substantially equal to the height of an opening formed in the cylinder of an evacuation channel arranged for uncombusted air-fuel mixture and combustion gases.

9. The piston according to claim 8 wherein the height of said lateral surface of the piston between said collection chamber and said at least first piston ring groove and said lateral surface between said collection chamber and said at least second piston ring groove are at least equal to the height of the opening of said evacuation channel.

\* \* \* \* \*